United States Patent
Ogram (10) Patent No.: US 11,745,602 B2
(45) Date of Patent: Sep. 5, 2023

(54) ELECTRIC CARGO TRUCKS

(71) Applicant: Mark Ogram, Tucson, AZ (US)

(72) Inventor: Mark Ogram, Tucson, AZ (US)

( * ) Notice: Subject to any disclaimer, the term of this patent is extended or adjusted under 35 U.S.C. 154(b) by 0 days.

(21) Appl. No.: 17/803,418

(22) Filed: Jun. 27, 2022

(65) Prior Publication Data
US 2023/0127684 A1   Apr. 27, 2023

Related U.S. Application Data (63) Continuation-in-part of application No. 17/803,327, filed on May 12, 2022, which is a continuation-in-part of application No. 17/803,241, filed on Mar. 29, 2022, now abandoned, which is a continuation of application No. 17/300,768, filed on Oct. 29, 2021, now abandoned, which is a continuation-in-part of application No. 17/300,357, filed on May 24, 2021, now Pat. No. 11,220,186.

(51) Int. Cl.
| | | |
|---|---|---|
| B60L 50/62 | (2019.01) | |
| B60L 53/22 | (2019.01) | |
| F02N 11/08 | (2006.01) | |

(52) U.S. Cl.
CPC .............. *B60L 50/62* (2019.02); *B60L 53/22* (2019.02); *F02N 11/0807* (2013.01)

(58) Field of Classification Search
CPC ................................. B60L 50/60; B60L 50/62
USPC ........................................................ 320/109
See application file for complete search history.

(56) References Cited

U.S. PATENT DOCUMENTS

| | | | |
|---|---|---|---|
| 3,784,230 A | 1/1974 | Worrall | |
| 4,457,346 A | 7/1984 | Wirnit | |
| 5,836,494 A | 11/1998 | Grunsted | |
| 6,390,215 B1 | 5/2002 | Kodama | |
| 6,445,080 B1 | 9/2002 | Daqoa | |
| 6,559,558 B2 | 5/2003 | Quesnel | |
| 7,140,338 B2 | 11/2006 | Janisch | |
| 8,562,011 B1 | 10/2013 | Smith | |
| 9,052,165 B1 * | 6/2015 | Rogers | F41H 7/005 |
| 10,189,442 B1 | 1/2019 | Ford | |
| 10,308,158 B2 | 6/2019 | Quenzi | |
| 10,836,225 B2 | 11/2020 | Robinson | |
| 10,967,750 B2 | 4/2021 | Lee | |
| 10,983,166 B2 | 4/2021 | Hellgren | |
| 10,989,087 B2 | 4/2021 | Yokoi | |
| 10,989,273 B2 | 4/2021 | Ott | |
| 10,994,719 B2 | 5/2021 | Obata | |
| 11,001,266 B2 | 5/2021 | Kasahara | |
| 2009/0101422 A1 * | 4/2009 | Subramanian | B60K 6/48 296/187.01 |
| 2010/0065344 A1 | 3/2010 | Collings | |
| 2013/0257145 A1 | 10/2013 | Caldeira | |
| 2014/0375272 A1 * | 12/2014 | Johnsen | B60L 58/19 320/136 |

(Continued)

*Primary Examiner* — Jerry D Robbins
(74) *Attorney, Agent, or Firm* — Mark Ogram (57) ABSTRACT

An electrically powered truck and system for charging or easily changing the internal rechargeable battery. The truck has an internal rechargeable electric battery which is exposed when a hatch on the truck is opened. The replacement rechargeable battery is inserted into the holding frame once the original rechargeable battery has been removed. The new rechargeable battery is then secured within the truck.

18 Claims, 9 Drawing Sheets

(56) References Cited

U.S. PATENT DOCUMENTS

2018/0056769 A1\* 3/2018 Kerspe .................... B60K 1/04
2022/0032796 A1\* 2/2022 Salter ..................... B60L 58/18

\* cited by examiner

ELECTRIC CARGO TRUCKS

PRIORITY

This is a continuation-in-part of U.S. patent application Ser. No. 17/803,327, filed on May 12, 2022, and entitled "Supplemental Battery for an Electric Vehicle", which was a continuation-in-part of U.S. patent application Ser. No. 17/803,241, entitled "Range Enhancing Platform" filed on Mar. 29, 2022; which was a continuation of U.S. patent Ser. No. 17/300,768, filed on Oct. 29, 2021, and entitled "Range Enhancing Platform"; which was a continuation in part of U.S. patent application Ser. No. 17/300,357, entitled "Range Enhancing Mechanism" filed on May 24, 2021, now U.S. Pat. No. 11,220,186.

BACKGROUND OF THE INVENTION

This invention relates generally to electrical vehicles and more particularly to a ready and fast mechanism to provide an on-the-go "recharge" to the vehicle and also for electrically powered cargo trucks.

Electric vehicles are touted as being environmentally friendly and as being more economical to operate. Estimates are that per-mile costs for fuel/energy, the electric vehicle is about half the cost of gasoline vehicles. With the cost of gasoline and diesel rising, the consumer is evaluating the electric vehicles in greater depth.

The biggest limiting factor for the potential consumer of an electric vehicle, is the limited range between recharging the battery. Often this range is only 300-400 miles which is more than suitable for suburban driving, but for interstate trips, the range limitation becomes problematic.

Further, if the battery becomes spent or exhausted, then the vehicle is left completely stranded. At the present time, the only solution is a tow to the next charging station.

It is clear there is a need to improve electric vehicles in order to make them acceptable to the general public.

SUMMARY OF THE INVENTION

The invention provides an assist apparatus for an electric vehicle which is powered by rechargeable batteries. To assist in the range of the electric vehicle, a platform is secured or towed by the vehicle. On the platform is a hydrocarbon motor that generates electricity. The hydrocarbon motor is activated, either manually via a handheld transmitter, via a switch connected to the hydrocarbon motor, or automatically by sensors in the electric vehicle to charge the rechargeable batteries within the electric vehicle.

In general terms, the invention involves an assist apparatus for an electric vehicle. The assist apparatus, when operating, provides a stream of electricity to the rechargeable battery on the electric vehicle. It is contemplated that the assist apparatus would not be used for traditional commutes but would be applicable for longer distances past the range of the electric vehicle's rechargeable battery, typically through a rental agency.

There are many versions of power systems used to recharge the battery. These include, but not limited to: U.S. Pat. No. 10,989,273, entitled "Power Unit" issued to Obrist et al. on Apr. 27, 2021; incorporated hereinto by reference.

The assist apparatus involves a platform which is securable to the vehicle (hanging on the bumper, attached to the towing slide, or via trailer) on which a traditional internal combustion engine is mounted. The internal combustion engine powers a generator and provides electricity to re-charge the rechargeable battery traditionally found in an electric vehicle via an electrical cable/connection.

The preferred embodiment has the engine mounted on a cantilever platform from the rear of the vehicle.

Those of ordinary skill in the art readily recognize a variety of electrical connections which may be employed in the context of charging the rechargeable battery, including, but not limited to: U.S. Pat. No. 0,967,750, entitled "System and Method for Charging Plug-in Hybrid Vehicle" issued to Lee et al. on Apr. 6, 2021; U.S. Pat. No. 10,989,087, entitled "Plug-In Hybrid Vehicle" issued to Yokoi on Apr. 27, 2021; all of which are incorporated hereinto by reference.

To operate the internal combustion engine, the preferred method is via a radio frequency handheld mechanism. The user, when they want to provide additional charge to the rechargeable battery, activates the internal combustion engine using he handheld transmitter; when done, the same radio frequency handheld transmitter is used to deactivate the internal combustion engine. In this way, the rechargeable battery is charged "on the go" without having to stop at a charging station.

Radio Frequency mechanisms are well known in the art for activating engines. These include: U.S. Pat. No. 6,559,558, entitled "Smart Car Starter" issued to Quesnel et al. on May 6, 2003; U.S. Pat. No. 7,140,338, entitled "Snowmobile Remote Ignition System" Issued to Janisch on Nov. 28, 2006; U.S. Pat. No. 10,189,442, entitled "Remote Vehicle Starter and Appliance Activation System" issued to Ford et al. on Jan. 29, 2019; all of which are incorporated hereinto by reference.

Further, should the electric vehicle become stranded due to a depleted rechargeable battery, a service provider is able to bring the assist apparatus to the site and recharge the battery, allowing the previously stranded driver to continue.

Besides the handheld mechanism described above, in another embodiment, the electric vehicle is equipped with a sensor on the rechargeable battery which activates, when needed, the assist apparatus.

A variety of mechanisms are used to monitor the rechargeable battery including, but not limited to: U.S. Pat. No. 10,983,166, entitled "Estimation of Battery Parameters" issued to Heligren et al. on Apr. 20, 2021; U.S. Pat. No. 10,994,719, entitled "Method and Device for Controlling Hybrid Vehicle" issued to Obata on May 4, 2021; U.S. Pat. No. 11,001,266, entitled "Hybrid Vehicle Drive System" issued to Kasahara on May 11, 2021; all of which are incorporated hereinto by reference.

An important aspect of the present invention is the ability to protect the assist apparatus from damage from impact with either another moving vehicle (being rear ended) or by backing into a solid object (e.g. a wall). To provide this protection, a secondary bumper (preferably either metal or hardened rubber) issued. The preferred bumper is U-shaped and arranged around three sides of the platform.

In one embodiment of the invention, the secondary bumper contacts the primary bumper on the electric vehicle allowing the electric vehicle's bumper to provide more endurance to the secondary bumper.

In another embodiment, springs extend from the "legs" of the U-shaped secondary bumper to engage (either on impact or all the time) with the vehicle's bumper. The use of springs diminishes the possibility of doing serious damage on what would be considered a "minor" impact.

In yet another embodiment of the secondary bumper, collapsible cylinders are use in lieu of the springs. These collapsible cylinders are crushable on impact and are readily replaced later.

As noted earlier, the platform and the assist apparatus are securable to the bumper (hung from the bumper), are supported by a slide hitch receptacle, or on a small trailer that is pulled by the electric vehicle. All of these embodiments make the present invention ideal for commercialization through a rental organization such as an establishment that rents/leases cars and other items for over the road travel.

Those of ordinary skill in the art readily recognize a variety of trailer mechanisms, including, but not limited to those described in: U.S. Pat. No. 8,562,011, entitled "Utility Trailer" issued to Smith on Oct. 22, 2013; U.S. Pat. No. 10,308,158, entitled "Utility Trailer with Movable Bed" issued to Quenzi et al. on Jun. 4, 2019; all of which are incorporated hereinto by reference.

Slide attachments for towing tailers are also well known in the art and include: U.S. Pat. No. 10,099,524, entitled "Adjustable Trailer Hitch" issued to Laundry on Oct. 16, 2018; and U.S. Pat. No. 10,696,112, entitled "Lightweight Hitch Structure" issued to Meingast et al. on Jun. 3, 2020; U.S. Pat. No. 10,836,225, entitled "Detachable Receiver" issued to Robinson et al. on Nov. 17, 2020; all of which are incorporated hereinto by reference.

Ideally, the internal combustion engine uses a variety of carbon based fuels such as gasoline, diesel, propane, and natural gas.

In one embodiment of the invention, the charging engine is mountable to the roof of the electric vehicle. In this embodiment, the driver of the vehicle does not have to change their driving/parking habits as the vehicle's outside dimensions remain the same.

One embodiment of the invention is an electric vehicle having an internal rechargeable battery. This rechargeable battery is recharged via a recharging connector. This embodiment of an electric vehicle has an external battery secured to an exterior of the electric vehicle. The external battery communicates electricity to the internal rechargeable battery via the recharging connector. Ideally the external battery is carried by a cantilevered platform from the electric vehicle, pulled by a trailer, or mounted to the roof of the electric vehicle.

As noted, the entire electric vehicle assembly of this embodiment employs the internal rechargeable battery and the recharging connector used to communicate electricity from an external source into the internal rechargeable battery. In this assembly, an external battery is employed and is secured to an exterior of the electric vehicle. Electricity from the external battery is communicated to the internal rechargeable battery via the recharging connector.

In the preferred embodiment of this embodiment, the external battery is a rechargeable battery allowing the external battery to be recharged periodically by the user.

The external battery is secured to the electric vehicle via a mounting mechanism which is either supported by the electric vehicle or is towed therefrom.

Ideally, the external battery is supported by a cantilevered platform which is mountable to a slide secured to the electric vehicle. Other embodiments mount the external battery onto the roof of the electric vehicle and still others place the external battery on a trailer to be towed by the electric vehicle. Ideally, the external battery is removable from the platform.

Securing the external battery to any of these platforms is done through a variety of mechanisms. In one mechanism, the external battery includes protruding teeth which engage with the mounting mechanism includes recesses to engage the protruding teeth. In another mechanism, the opposite arrangement is done in which protruding teeth from the mounting mechanism engage recesses within the external battery. In yet another mechanism used to secure the external battery to the platform, the external battery includes flanges which are grasped/compressed by the mounting mechanism.

In all of these mounting mechanisms, ideally the external battery is selectively releasable from the mounting mechanism allowing the external battery to be replaced readily. Typically, this release is done manually.

In one embodiment of the invention, an electric vehicle accessory is created which assists in the connecting and disconnecting of the external battery from the system. In this embodiment, the platform as outlined above, is used. The platform has a mounting surface upon which the external electrical battery is placed. The external battery is held in place using at least two engagement mechanisms which selectively engage the external battery to secure it to the mounting surface using any of the techniques as outlined above to the platform.

The platform further includes an electrical connector which engages with an electrical connector from the external battery and selectively communicates electricity from the external battery to the internal rechargeable battery. This connection is only accomplished when the engagement mechanism is engaged, which also connects the external battery as well.

Activation of the engagement mechanism and the relay switch connecting the external battery to the electric vehicle's electrical connector, is accomplished either manually (ideally using a lever) or via an electrical motor. an external battery placed on the mounting surface of the platform. The external battery has an electrical cable or cable securable to the electrical connector of the platform. By electrically isolating the external battery from the internal rechargeable battery, the external battery can be removed safely.

In another embodiment of the invention, the rechargeable capabilities are extended to trucks and trolleys. With the cost per mile driven of diesel being about twice as that of electricity, and with the unsightly and costly installation of overhead wires for trolleys, the use of electricity is warranted.

In this context, the invention provides for an electrically powered truck and system allowing easy changing of the internal rechargeable battery. With rapid exchange of rechargeable batteries, the range of the truck is significantly enhanced allowing "truck stop" type of arrangements to service the truck by replacing the rechargeable battery in a short period of time; thereby eliminating the extensive "down time" that is required for traditional recharging of batteries.

Once removed, the depleted rechargeable battery is recharged using traditional methods and then is available for use on another truck.

The truck has an internal rechargeable electric battery which is exposed when a hatch on the truck is opened. The replacement rechargeable battery (which is fully charged) is inserted into the holding frame/mechanism, once the original rechargeable battery has been removed. The new rechargeable battery is secured within the truck using the hooks as discussed above.

The exchange mechanism provides: (1) a detachment mechanism selectively releasing the latching mechanism or hooks: (2) a removal mechanism adapted to remove the spent internal electric battery from the truck by grasping and sliding the spent internal electric battery from a frame or bracket within the truck; (3) a replacement mechanism placing the charged replacement rechargeable battery in the truck's frame or bracket; and, (4) securing the latching mechanism to the charged replacement battery.

In the preferred embodiment, the replacement rechargeable battery is reconnected to the truck automatically when the replacement rechargeable battery is inserted into the frame; other embodiments allow for a manual electrical reconnection.

Ideally, the frame or holding mechanism is angled upwards toward the front of the electrically powered cargo truck. This facilitates the ready removal of the old rechargeable battery and the insertion of the replacement rechargeable battery. In the preferred embodiment, the frame or holding mechanism is swivelly secured at a first end to the electrically powered truck (in a passive state, the frame/holding mechanism is positioned substantially horizontally). With the use of a lifting mechanism secured to the electrically powered truck, the second end of the frame/holding mechanism to selectively raised giving the frame/holding mechanism to the desired upwards angle for insertion and withdrawal of the rechargeable electric battery.

As noted earlier, the preferred embodiment automatically reconnects the replacement rechargeable battery to the truck. The preferred embodiment for this task is where an electrical connector engages the replacement battery when the holding mechanism is moved into the passive state (down). In this context, the electrical connector is positioned below the holding/frame mechanism.

Another mechanism which is contemplated for connecting the replacement electrical battery is where the electrical connector is engaged when then replacement battery is inserted into the holding mechanism.

As noted earlier this invention is also used for trolleys or bus which are structured to carry passengers within a city. A trolley is defined as having at least ten passenger seats located within the electrically powered truck. In some embodiments, the trolley/bus is mounted on metal tracks.

In the application of the trolley/bus, ideally a hatch is located at a front (or rear) of the electrically powered trolley/bus. The hatch serves the same purpose as the hood described above, that is, when the hatch is open, the rechargeable electrical battery is exposed allowing the rechargeable electrical battery to be removed and a replacement rechargeable battery inserted therein.

The invention, together with various embodiments thereof, will be explained in detail by the accompanying drawings and the following descriptions thereof.

DRAWINGS IN DETAIL

Figure 1A:
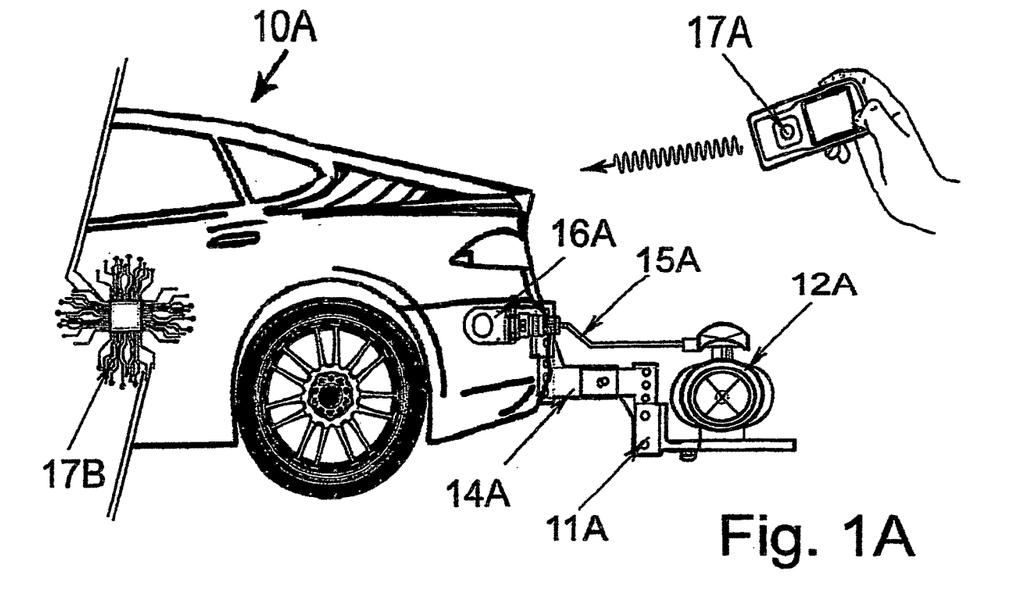
FIGS. 1A and 1B are side and top views of the preferred embodiment of the invention wherein the assist system is secured to the vehicle via a towing slide mount.
Figure 1B:
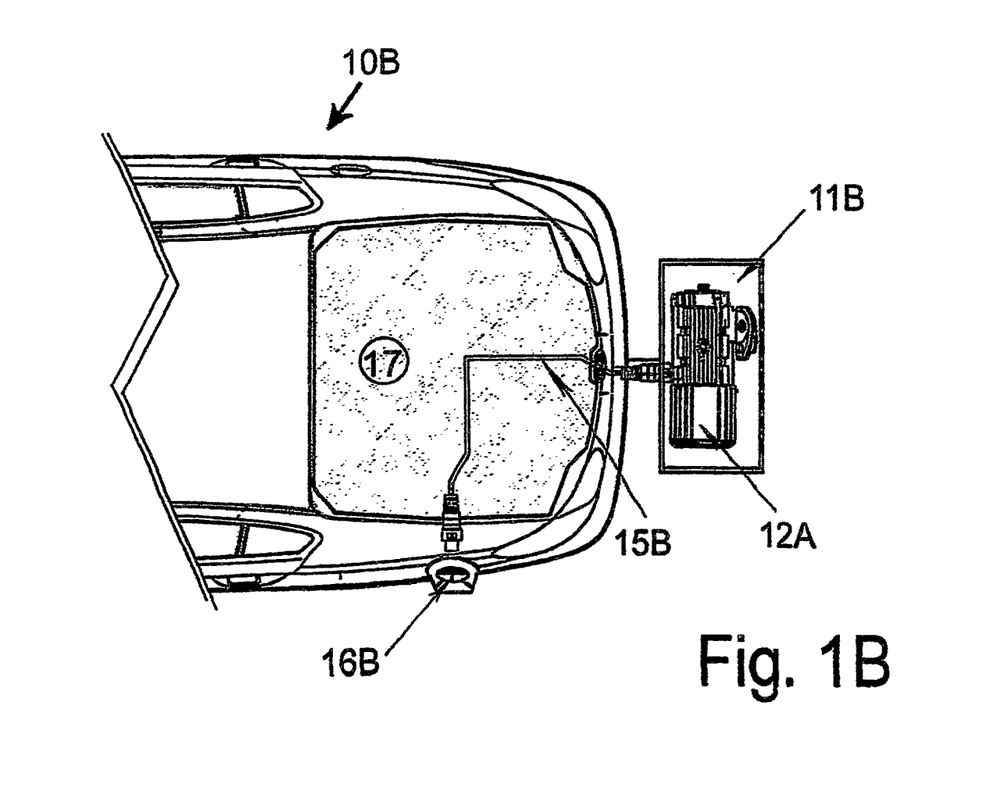

FIGS. 1A and 1B are side and top views of the preferred embodiment of the invention wherein the assist system is secured to the vehicle via a towing slide mount.

Referring to FIG. 1A, vehicle 10A has a slide mount 14A secured thereto. Platform 11A is secured into slide mount and presents a foundation for the mounting of motor/generator 12A. Electrical energy from motor/generator 12A is fed through electrical cable 15A which is connected to receptacle 16A of the electric vehicle 10A.

Receptacle 16A is the traditional connector used to recharge the rechargeable battery (not shown) within vehicle 10A. Unlike the illustration, in the preferred embodiment, receptacle 16A is positioned at the rear of vehicle 10A permitting easier connection with electrical cable 15A.

Activation and deactivation of motor/generator 12A is preferably done via radio transmitter 17A which is illustrated exterior to vehicle 10A, but, in the ideal embodiment, the operator of vehicle 10A activates from within vehicle 10A, to activate motor/generator 12A when the operator deems that the rechargeable battery needs to be boosted.

Alternatively, sensor 17B monitors the charge within the rechargeable battery and activates/deactivates motor/generator 12A when needed.

The embodiment, with the electrical connection within vehicle 10A, is illustrated in FIG. 1B. Again, platform 11B is secured to vehicle 10B on which is mounted motor/generator 12A. In this embodiment, electrical cable 15B is passed into trunk 17 to connect with receptacle 16B. Receptacle 16B is optionally created during manufacture of the electric vehicle 10B or is installed as an after-market item.

The embodiment of FIG. 1B provides more protection for the connection between electrical cable 15B and receptacle 16B.

Mounting, and dismounting the assist apparatus to the vehicle is ideally done as a two-step process. In mounting, first the platform is secured to the vehicle and then the motor/generator is secured to the platform. Dismounting is done in the reverse. This two-step process is easier due the component's weight.

Figure 2:
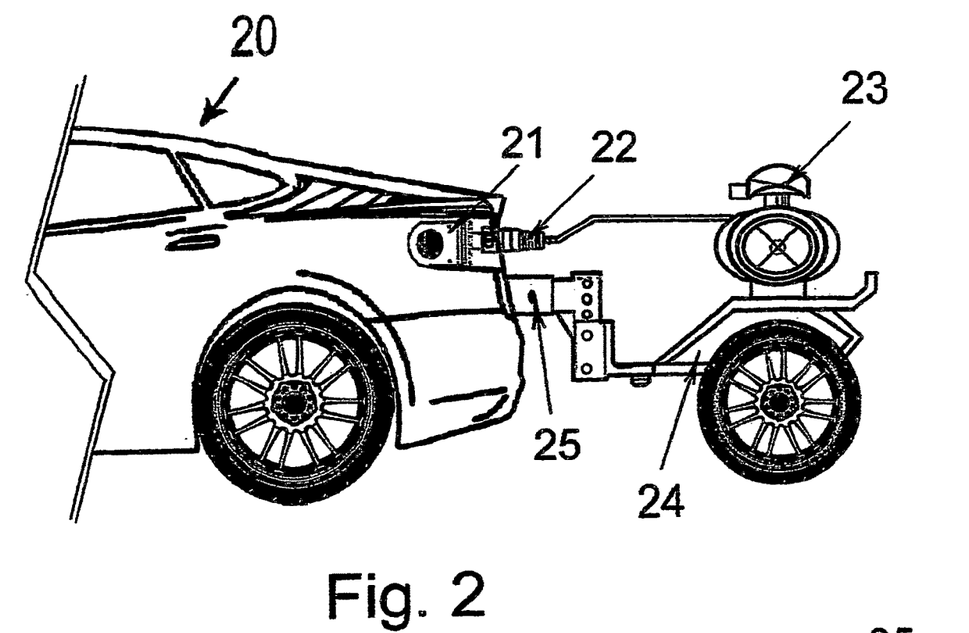
FIG. 2 is side view in which the assist system is being towed as a trailer.

FIG. 2 is side view in which the assist system is being towed as a trailer.

In this embodiment of the invention, vehicle 20 is equipped with a tow bracket 25 which is secured to trailer 24. Motor/generator 23 is carried by trailer 24. Power from the motor/generator 23 is communicated to vehicle 20 and its electrical receptacle 21 via electrical cable 22.

Figure 3:
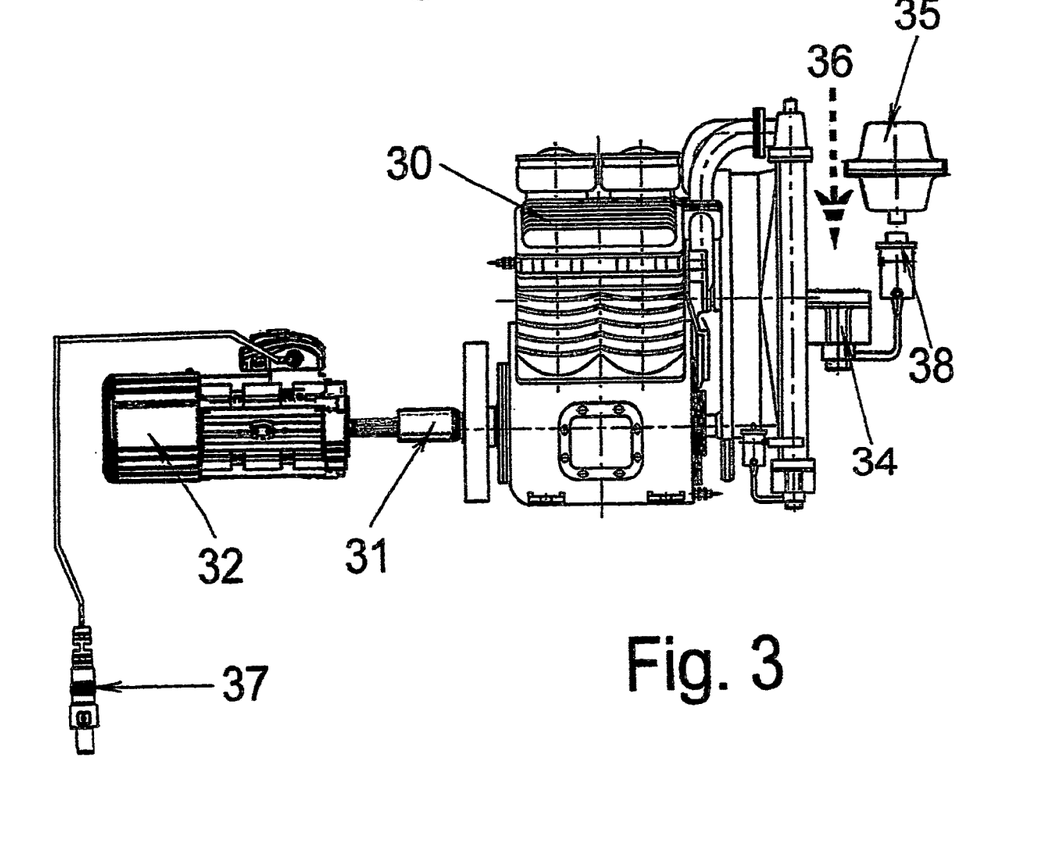
FIG. 3 illustrates the internal combustion engine of the present invention.

FIG. 3 illustrates the internal combustion engine of the present invention.

In the preferred embodiment, motor 30 is a typical internal combustion engine with its exhaust being muffled for noise concerns. Drive shaft 31 from motor 30 drives generator 32 and the electricity therefrom is communicated to the vehicle (not shown) via electrical cable 37.

Motor 30 is powered by hydrocarbon s such as gasoline and diesel in liquid form. Cannister 35 is used to contain hydrocarbons in the gaseous state such as propane and natural gas. Cannister 35 is securable to inlet 38 as indicated by arrows 36.

Figure 4:
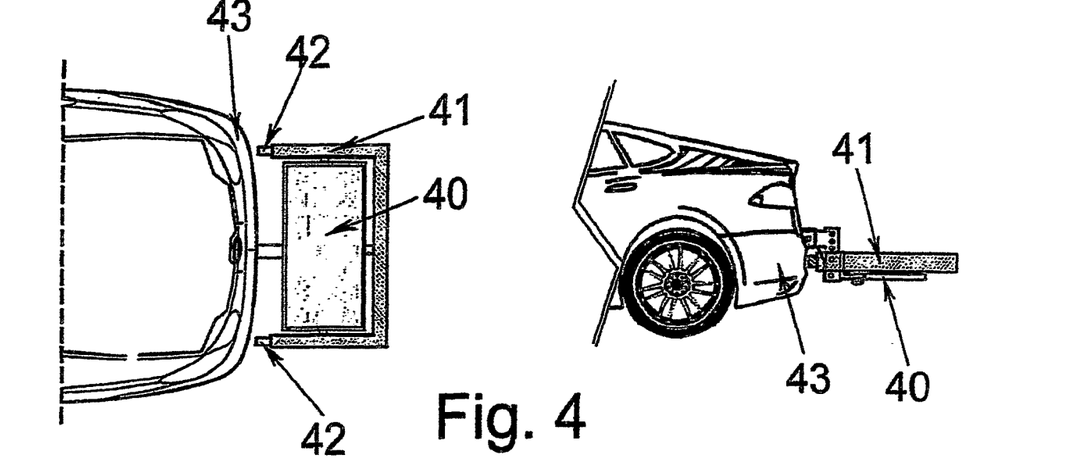
FIG. 4 illustrates the preferred secondary bumper protection of the assist system in which the secondary bumper contacts the bumper on the vehicle.

FIG. 4 illustrates the preferred embodiment of the U-shaped secondary bumper protection of the assist system in which the secondary bumper contacts the bumper on the vehicle.

Bumper 40 is generally U shaped with end of the legs 42 proximate to the vehicle's bumper 43. In this embodiment, legs 42 do not contact bumper 43 except during impact. In other embodiments, legs 42 are held firmly against bumper 43.

Figures 5A, 5B:
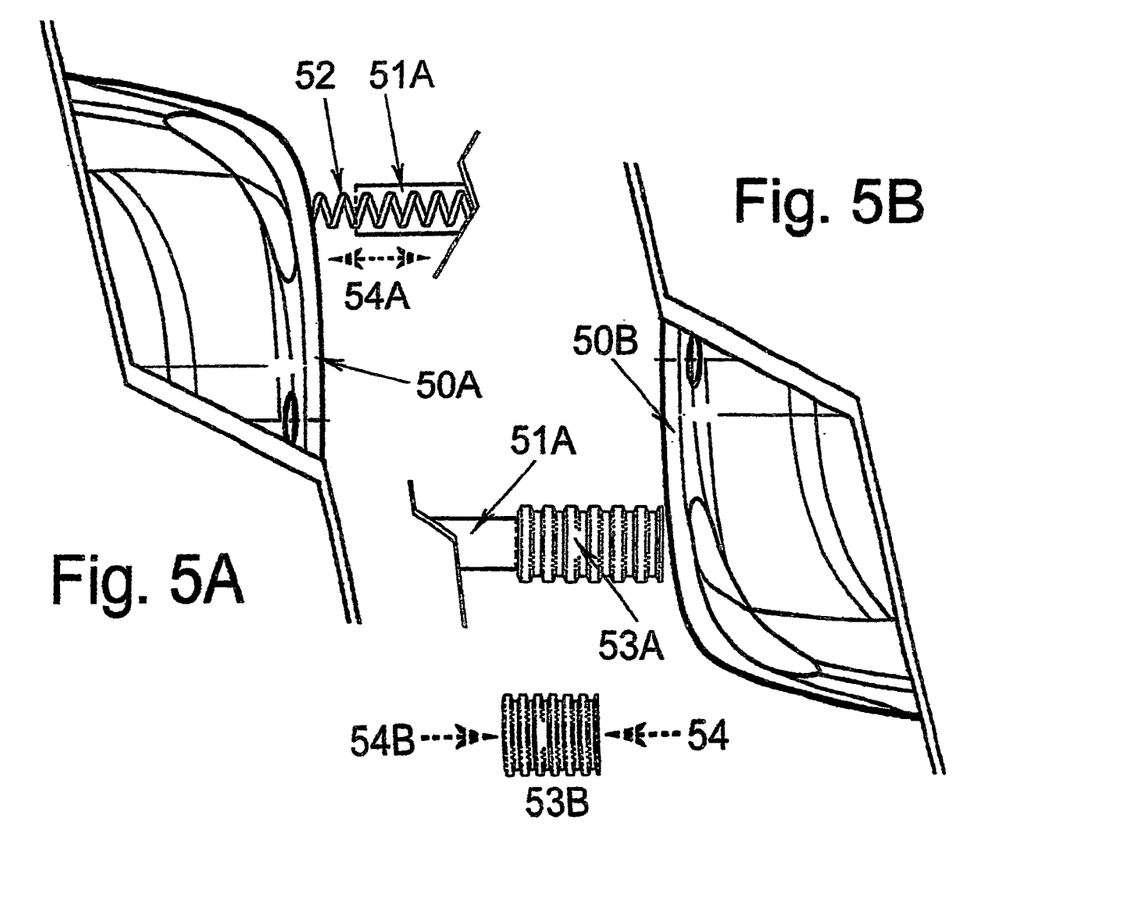
FIGS. 5A and 5B illustrate two embodiments which are meant to reduce damage due to impact of the secondary bumper.

FIGS. 5A and 5B illustrate two embodiments which are meant to reduce damage due to impact of the secondary bumper.

Referring to FIG. 5A, a top view and side view of the preferred bumper used to protect the motor/generator, leg 51A (only one shown in this illustration) are hollow and contain a spring 52 which extends from leg 51A so that on impact with the bumper, leg 51A is forced (arrow 54A) toward the electric vehicle's bumper 50A, allowing spring 52 to absorb the impacts force to minimize damage to bumper protecting the motor generator.

In FIG. 5B, a collapsible cannister 53A is secured to leg 51A. When the leg 51A and cannister 53A, are pressed against the vehicle's bumper 50B, collapsible cannister "crumbles" 53B as shown by arrow 54B. This crumbling absorbs the impact force to minimize damage.

Figure 6:
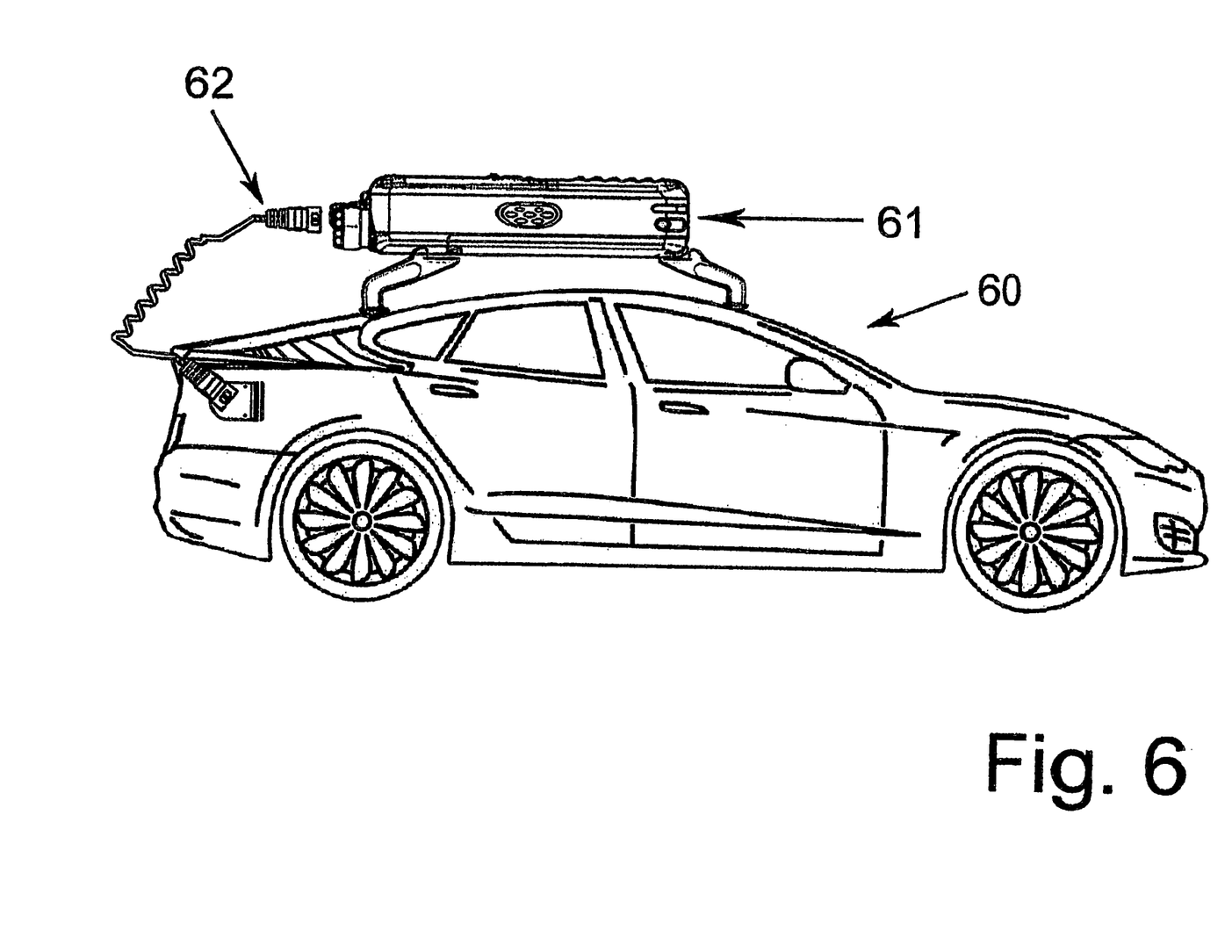
FIG. 6 illustrates an embodiment of the invention in which the charging engine is mounted on the roof of the vehicle.

FIG. 6 illustrates an embodiment of the invention in which the charging engine is mounted on the roof of the vehicle.

In this embodiment, platform and charging engine 61 are mounted on the roof of vehicle 60. Power from charging engine 61 is communicated to the battery (not shown) within the vehicle 60 via electrical cable 62.

Figure 7:
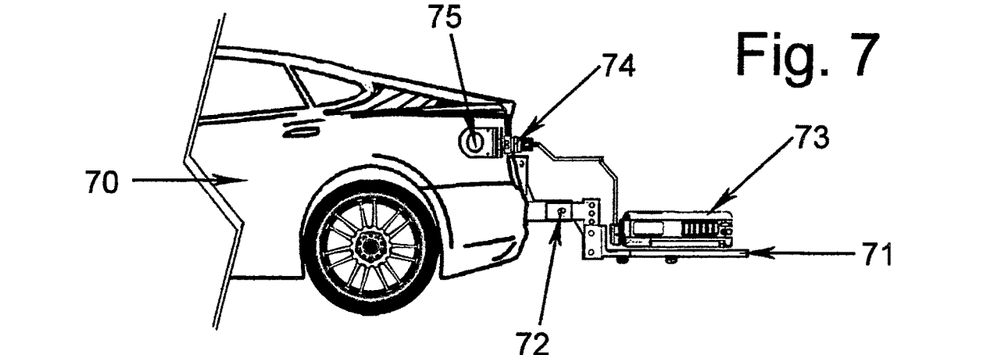
FIG. 7 illustrates the preferred mounting of the auxiliary battery to the electric vehicle.

FIG. 7 illustrates the preferred mounting of the auxiliary battery to the electric vehicle.

Electric vehicle 70 has an internal rechargeable battery (not shown) as discussed above. A recharging connector 75 is used to charge the internal rechargeable battery as discussed above. Electricity from an external source (not shown) is communicated to the internal rechargeable battery via the recharging connector 75.

External battery 73 (ideally rechargeable) is secured to an exterior of the electric vehicle 70 via a cantilevered platform or mounting mechanism 71 which is secured to the vehicle via a slide connector 72. A similar such platform is discussed in FIG. 4 herein.

An electrical connection 74 electrically connects, via the recharging connector 75, the external battery to the internal rechargeable battery, thereby extending the life of internal rechargeable battery.

Figure 8A:
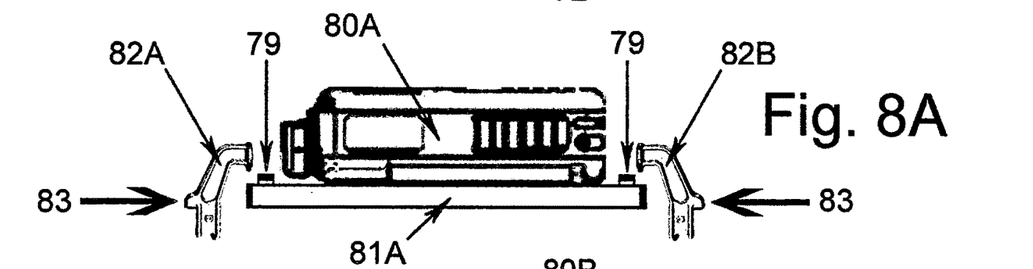
FIGS. 8A, 8B, and 8C illustrate different mounting mechanisms for the auxiliary battery.
Figure 8B:
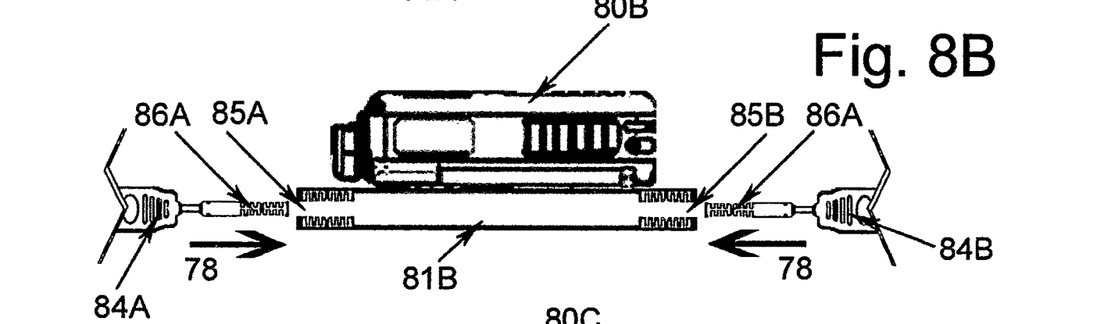
Figure 8C:
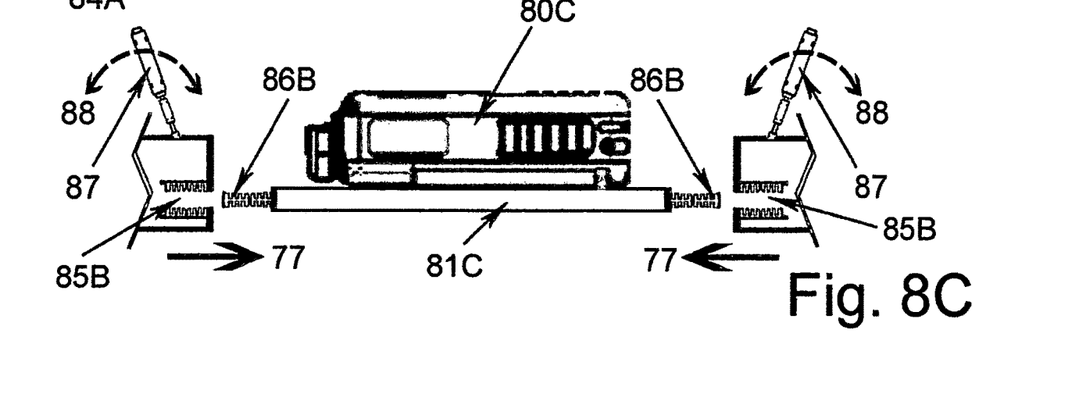

FIGS. 8A, 8B, and 8C illustrate different mounting mechanisms for the auxiliary battery.

Referring to FIG. 8A, external battery 80A includes flanges 79 which are selectively grasped by the mounting mechanisms 82A and 82B as, indicated by arrows 83. This compression by flanges 79, secures the external battery to the platform or mounting mechanism (not shown). Flanges 79 are slidably secured to the mounting mechanism (not shown).

FIG. 8B is another method of securing the external battery to the mounting platform. In this embodiment, external battery 80B has a base member 81B which includes openings 85A and 85B which receive teeth 86A therein when tooth mechanism 84A and 84B are pressed as indicated by arrows 78. Movement of tooth mechanisms 84A and 84B, is ideally accomplished by an electric motor.

In yet another method, FIG. 8C secures the external battery to the mounting platform. In this embodiment, external battery 80C has a base member 81C which include teeth which are engaged by recesses within movable blocks 85B. Movement of blocks 85B, as indicated by arrows 77, is accomplished by manually through levers 87 which are moved as indicated by arrows 88.

In all of the mounts of FIGS. 8A, 8B, and 8C, the external battery is easily installed and released so that it can be replaced at will.

Figure 9A:
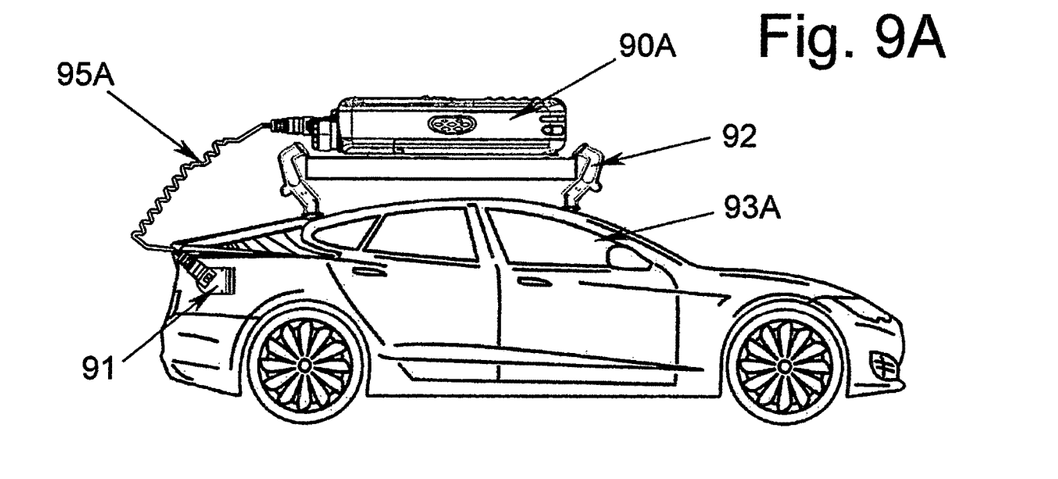
FIGS. 9A and 9B illustrate alternative mounting/towing mechanisms for the auxiliary battery.
Figure 9B:
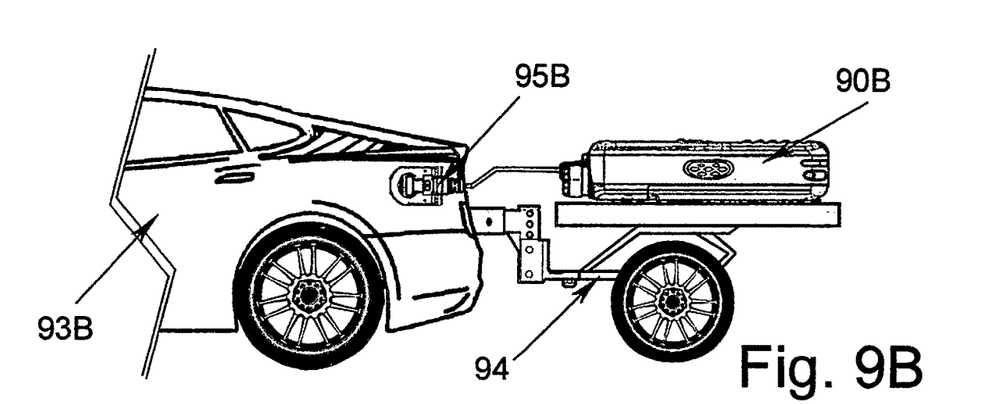

FIGS. 9A and 9B illustrate alternative mounting/towing mechanisms for the auxiliary battery.

FIG. 9A illustrates a top mount for the external battery in a similar fashion to that described relative to FIG. 6. In FIG. 9A though, external battery 90 is secured to mounting mechanism 92 located on the roof of electric vehicle 93A. Electricity from external battery 90A is communicated using conduit/electrical wire 95A via connector 91.

FIG. 9B is similar to the arrangement discussed in FIG. 2. For the external battery embodiment, trailer 94 has a mounting mechanism as discussed above to mount the external battery 90B thereto. In this illustration, the connector for the electrical connection is located within the trunk of electric vehicle 93B and is accessed using electrical conduit wire 95B.

Figure 10A:
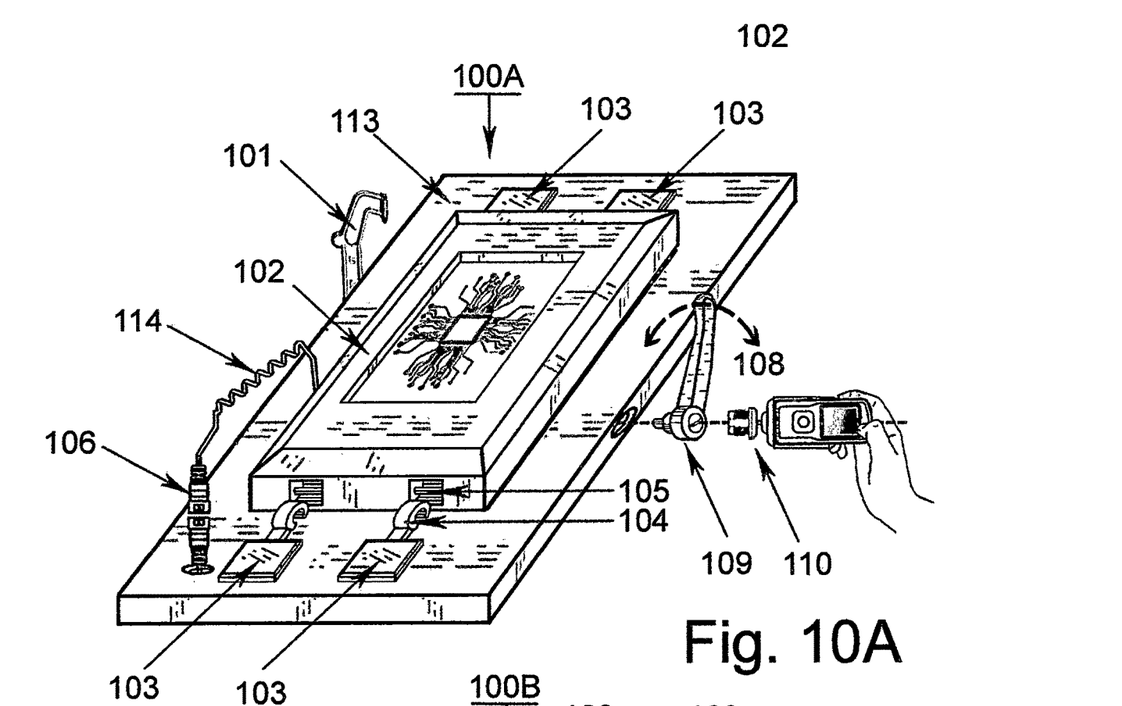
FIG. 10A is a perspective view of the upper side of an embodiment of the invention.

FIG. 10A is a perspective view of the upper side of an embodiment of the invention.

Figure 10B:
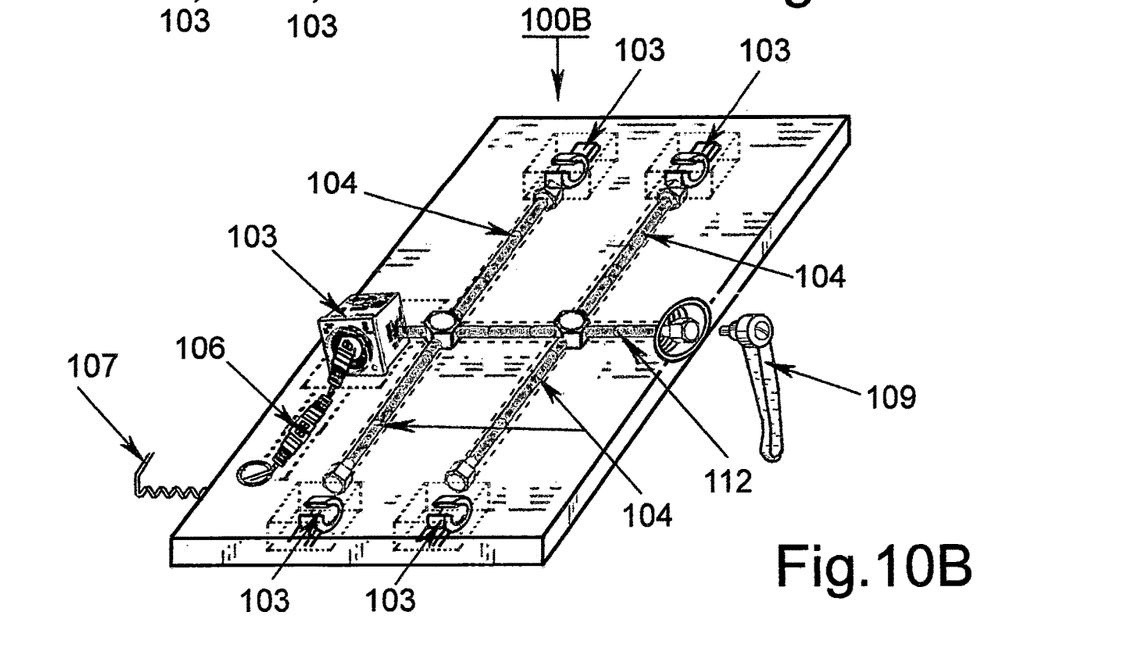
FIG. 10B is a perspective view of the underside of an embodiment of the invention relative to FIG. 10A.

FIG. 10B is a perspective view of the underside of the an embodiment of the invention relative to FIG. 10A

Referring to both figures, the electric vehicle accessory of this embodiment interacts with the internal rechargeable battery within the electric vehicle. In this embodiment, platform 100A (its underside 100B) is secured to the electric vehicle by insert 101 as described above. This embodiment is also applicable for the roof mounted application and the trailer application.

Platform 100A has a mounting surface 113 which includes, in this illustration, four engagement mechanisms 103, each having a prong/finger 104. These prongs/fingers 104, when the engagement mechanism 103 is pressed against battery 102, and engage recesses 105 to secure the electric battery 102 to the surface 113 of platform 100A.

This engagement is ideally accomplished manually using lever 109 which is rotated as indicated by arrow 108. Movement of lever 109, causes internal rod 112 to rotate which moves connecting rods 104 to move the engagement mechanisms 104 to selectively engage or disengage with the battery 102. Alternatively, electric motor 110 is used in lieu of the manually operated lever 108.

Movement of lever 109 also causes relay switch 103 to selectively close or open. Relay switch 103 controls the operation of electrical connector 106 which receives electricity from battery 102 via electrical line 114 and selectively passes the electricity from battery 102 to the rechargeable battery (not shown) via electrical line 103. In this manner, movement of lever allows the operator selectively electrically connect or isolate battery 102 from the rechargeable battery (not shown) within the electric vehicle. This provides additional safety for the operator.

Figure 11:
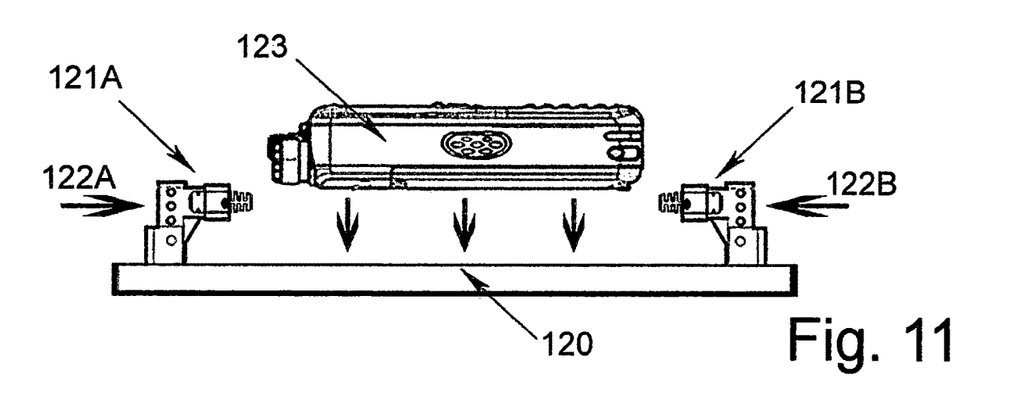
FIG. 11 illustrates a mounting platform.

FIG. 11 illustrates a mounting platform.

Battery 123 is placed onto platform 120. To secure the battery 123 to the platform 120, engagement mechanisms 121A and 121B to move and engage battery 123 as outlined above.

Figure 12:
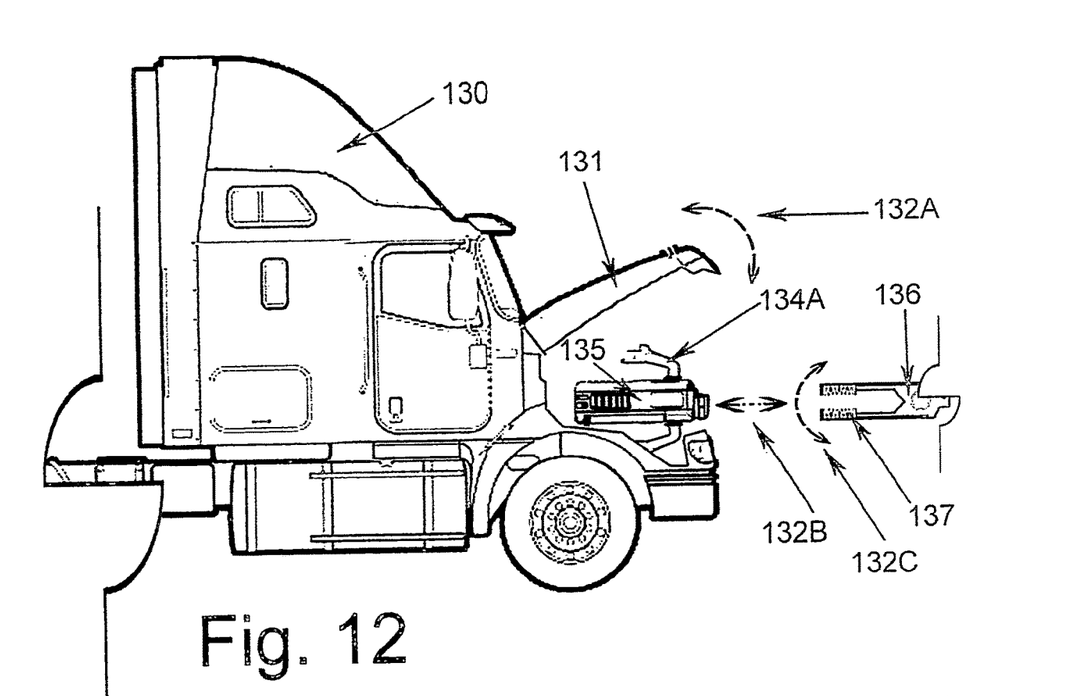
FIG. 12 illustrates an embodiment of the cargo truck with the rechargeable battery.

FIG. 12 illustrates an embodiment of the cargo truck with the rechargeable battery.

In this embodiment, truck 130 has a hood 131 which is raised as indicated by arrow 132A to reveal the rechargeable electric battery 135. Rechargeable electric battery 135 is secured within truck 130 using latch 134A as described above.

In the removal of rechargeable electric battery 135, removal mechanism 136 is pressed against the rechargeable battery 134 as indicated arrow 132B. Jaws 137 press against latch 134A to release latch 134A, jaws 137 grasp rechargeable battery 135 which is be removed from the truck 130.

Placement of a fully charged battery is accomplished in the opposing manner.

Figure 13:
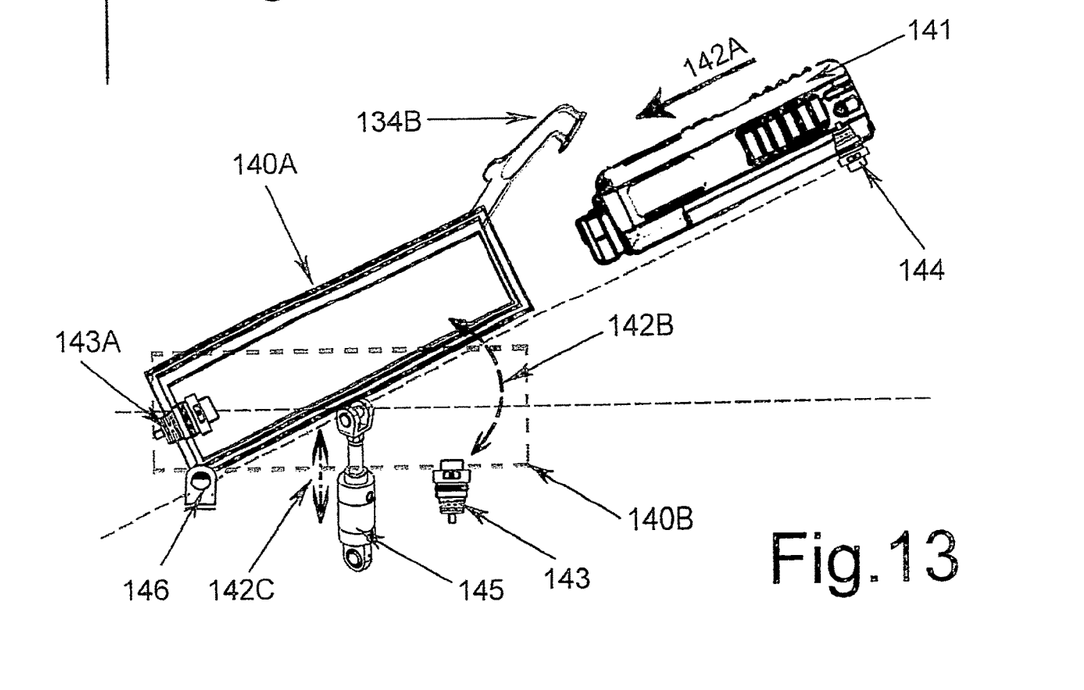
FIG. 13 illustrates the preferred embodiment of the frame used to hold the rechargeable battery.

FIG. 13 illustrates the preferred embodiment of the frame used to hold the rechargeable battery.

In this preferred embodiment, frame 140A is angled upwards and latch 134 is used to secure the rechargeable electric battery 141 once it is placed within frame 140A as indicated by arrow 142A.

One embodiment of the invention maintains the frame 140A in this position (angled upwards and not movable) to facilitate easy removal of the rechargeable battery, ideally, connection between rechargeable electric battery 141 with the electrical component of the truck (not shown) is via connector 143A which engages with the rechargeable battery 141 when it is fully inserted into frame 140A.

Another embodiment places the end of frame on a pivot or swivel 146 allowing the frame to be raised or lowered (140B) as required by ram 145. This embodiment allows the rechargeable electric battery to be held in a substantially horizontal position 140B and be raised/angled upward into the space formerly containing the hatch of the truck; thereby, allowing easy removal and insertion of the rechargeable battery 141.

In this embodiment, electrical connection between the rechargeable battery 141 and the truck is established when the frame in lowered and connectors 144 and 143 engage each other as indicated by arrows 142B.

Figure 14:
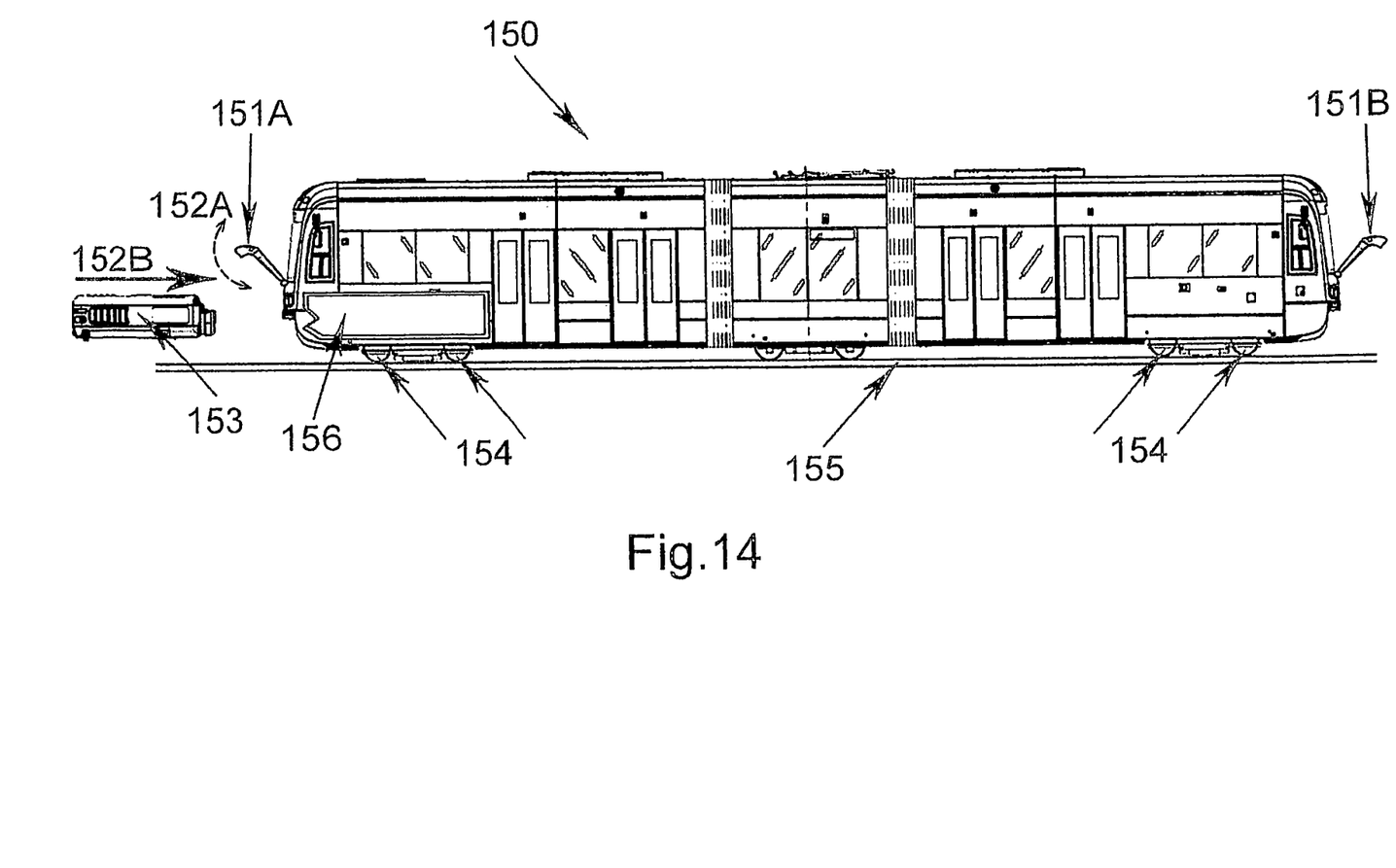
FIG. 14 illustrates an embodiment of the trolley or bus with the rechargeable battery.

FIG. 14 illustrates an embodiment of the trolley or bus with the rechargeable battery.

Trolly/bus 150 has a front hatch 151B and/or a rear hatch 151A. When opened, 152A, the internal rechargeable battery 153 is revealed within frame 156 as discussed above. After insertion as indicated by arrow 152B, the rechargeable electric battery 153 powers the trolly/bus 150, which in one embodiment has wheels 154 restring on track 155.

In this way, Trolly/bus 150 can hold a number of passengers (ideally more than ten) and transport them at reduced cost per mile and without generating hydrocarbon pollutants.

It is clear that the present invention provides for an improvement for electric vehicles in order to make these vehicles more acceptable to the general public.

What is claimed is:

1. A truck and system comprising:
   a) a truck being powered by an internal rechargeable electric battery, said truck having,
      1) a propulsion unit being powered by the internal rechargeable electric;
      2) an openable hatch which, when open, reveals the internal rechargeable electric battery, and,
      3) a latching member restraining the internal rechargeable electric battery;
   b) a replacement rechargeable battery; and,
   c) an exchange mechanism having,
      1) a detachment mechanism selectively releasing the latching member,
      2) a removal mechanism adapted to remove the internal rechargeable electric battery from the truck,
      3) a replacement mechanism adapted to place the replacement rechargeable battery in the truck, and,
      4) a reattachment mechanism securing the latching member to the replacement rechargeable battery.

2. The truck system according to claim 1, further including a holding frame within the truck adapted to secure the internal rechargeable electric battery.

3. The truck system according to claim 2, wherein the holding frame is angled upwards toward the front of the truck.

4. The truck system according to claim 3,
   a) wherein the holding frame is swivelly secured at a first end thereof to the truck and is positioned substantially horizontally in a passive state; and,
   b) further including a lifting mechanism secured to the truck and proximate to the second end of the holding frame to selectively raise or lower the second end of the holding frame.

5. The truck system according to claim 4, further including an electrical connector adapted to engage the replacement rechargeable battery when the holding frame is in the passive state.

6. The truck system according to claim 5, wherein the electrical connector is engaged when then replacement rechargeable battery is inserted into the holding frame.

7. The truck and system according to claim 4, further including an electrical connector positioned below the second end of the holding frame.

8. The truck system according to claim 2, further including at least ten passenger seats located within the truck.

9. The truck system according to claim 8, wherein the truck is mounted on metal tracks.

10. The truck system according to claim 8, wherein the hatch is located at a front of the electrically powered truck.

11. The truck system according to claim 8, wherein the hatch is located at a back of the truck.

12. An electrically powered cargo truck system comprising:
   a) a cargo truck having a propulsion unit powered by an internal rechargeable electric battery, said cargo truck having, an openable hatch which, when open, reveals the internal rechargeable electric battery therein;
   b) a replacement rechargeable battery; and,
   c) an exchange mechanism having,
      1) a removal mechanism adapted to grasp and remove the internal rechargeable electric battery, and,
      2) a replacement mechanism adapted to place the replacement rechargeable battery in the cargo truck.

13. The electrically powered cargo truck system according to claim 12, further including a holding frame securing the internal rechargeable electric battery within the cargo truck, the holding frame being angled upwards toward the front of the electrically powered cargo truck.

14. The electrically powered cargo truck system according to claim 13,
   a) wherein the holding frame is swivelly secured at a first end thereof to the electrically powered cargo truck; and, b) further including a lifting mechanism secured to the electrically powered cargo truck and proximate to the second end of the holding frame to selectively raise the second end of the holding mechanism.

15. The electrically powered cargo truck and system for charging according to claim 14, further including an electrical connector connecting the internal rechargeable electric battery to the propulsion unit, said electrical connector being engaged when the replacement battery is inserted into the holding frame.

16. The electrically powered cargo truck and system for charging according to claim 12, wherein the exchange mechanism removes the internal rechargeable electric battery vertically.

17. A cargo truck comprising:
   a) an electric motor driving at least one wheel on the cargo truck;
   an openable hatch which, when open, reveals an internal rechargeable electric battery therein connectable to the electric motor;
   c) a holding frame securing the internal rechargeable electric battery within the cargo truck, said holding frame angled upwards toward the front of the electrically powered cargo truck and swivelly secured at a first end thereof to the cargo truck; and,
   d) a lifting mechanism secured to the cargo truck and proximate to the second end of the holding frame to selectively raise the second end of the holding frame.

18. The cargo truck according to claim 17, further including an electrical connector connecting the internal rechargeable electric battery to the electric motor within the cargo truck.

\* \* \* \* \*